United States Patent [19]
Horvat

[11] Patent Number: 5,897,151
[45] Date of Patent: Apr. 27, 1999

[54] TOOL HANDLE MOUNT

[76] Inventor: Ricardo Nicola Horvat, 26103 28th Avenue, Aldergrove, BC, Canada, V4W 2W3

[21] Appl. No.: 09/090,137

[22] Filed: Jun. 4, 1998

[51] Int. Cl.[6] .................................. A01B 1/22; B25G 3/24
[52] U.S. Cl. .............................................. 294/57; 403/361
[58] Field of Search ............................ 294/19.1, 49, 57, 294/59; 16/113, 114 R; 403/361, 377, 383

[56] References Cited

U.S. PATENT DOCUMENTS

| | | | |
|---|---|---|---|
| 668,982 | 2/1901 | Covel | 294/57 |
| 1,411,195 | 3/1922 | Shingler | 294/57 |
| 1,930,000 | 10/1933 | Bulger | 294/57 |
| 5,120,098 | 6/1992 | KChildress | 294/57 |
| 5,533,768 | 7/1996 | Mitchell | 294/57 |

*Primary Examiner*—Dean Kramer

[57] ABSTRACT

A new tool handle mount for attaching an elongate handle to a tool. The inventive device includes an elongate tubular member having inner and outer surfaces, proximal and distal ends, and a plurality of side walls extending between the proximal and distal ends. The proximal end of the tubular member is coupled to a tool head. The inner surface of the tubular member defines an interior space of the tubular member. The distal end of the tubular member has an opening into the interior space. The opening of the distal end is adapted for inserting an end of an elongate handle therethrough into the interior space of the tubular member. A fastening device is provided for holding a handle inserted into interior space of the tubular member to the tubular member.

14 Claims, 2 Drawing Sheets

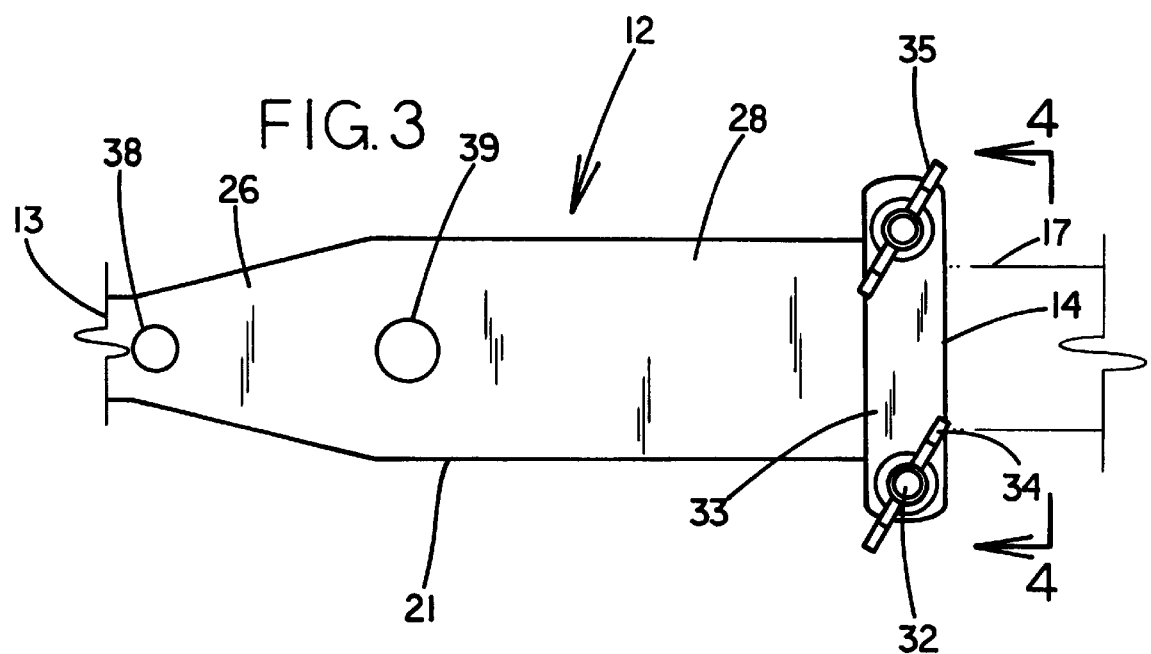
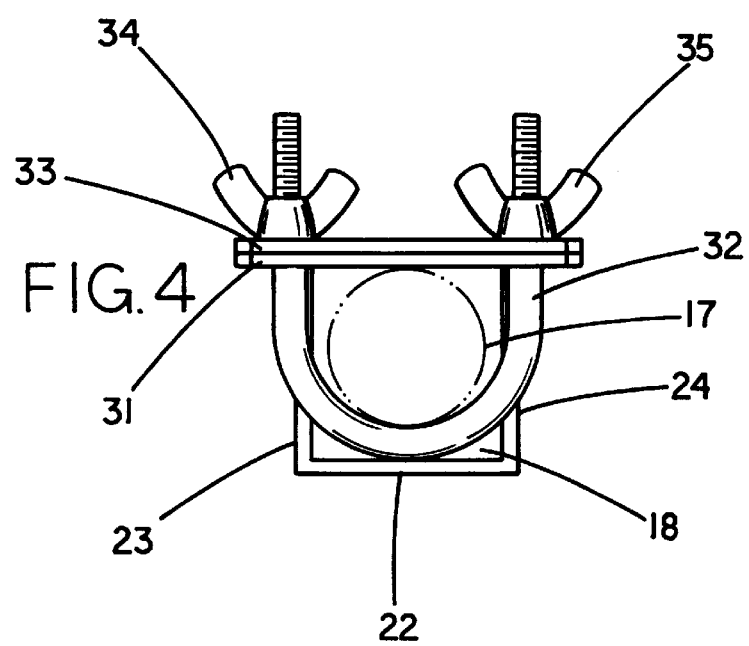

TOOL HANDLE MOUNT

BACKGROUND OF THE INVENTION

1. Field of the Invention

The present invention relates to devices for attaching a handle to a tool and more particularly pertains to a new tool handle mount for attaching an elongate handle to a tool.

2. Description of the Prior Art

The use of devices for attaching a handle to a tool is known in the prior art. More specifically, devices for attaching a handle to a tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for attaching a handle to a tool include U.S. Pat. No. 5,185,992; U.S. Pat. No. 5,415,448; U.S. Pat. No. 5,394,594; U.S. Pat. No. 5,404,616; U.S. Pat. No. 5,269,045; and U.S. Pat. No. Des. 252,652.

While these devices fulfill their respective, particular objectives and requirements, the aforementioned patents do not disclose a new tool handle mount. The inventive device includes an elongate tubular member having inner and outer surfaces, proximal and distal ends, and a plurality of side walls extending between the proximal and distal ends. The proximal end of the tubular member is coupled to a tool head. The inner surface of the tubular member defines an interior space of the tubular member. The distal end of the tubular member has an opening into the interior space. The opening of the distal end is adapted for inserting an end of an elongate handle therethrough into the interior space of the tubular member. A fastening device is provided for holding a handle inserted into interior space of the tubular member to the tubular member.

In these respects, the tool handle mount according to the present invention substantially departs from the conventional concepts and designs of the prior art, and in so doing provides an apparatus primarily developed for the purpose of attaching an elongate handle to a tool.

SUMMARY OF THE INVENTION

In view of the foregoing disadvantages inherent in the known types of devices for attaching a handle to a tool now present in the prior art, the present invention provides a new tool handle mount construction wherein the same can be utilized for attaching an elongate handle to a tool.

The general purpose of the present invention, which will be described subsequently in greater detail, is to provide a new tool handle mount apparatus and method which has many of the advantages of the devices for attaching a handle to a tool mentioned heretofore and many novel features that result in a new tool handle mount which is not anticipated, rendered obvious, suggested, or even implied by any of the prior art devices for attaching a handle to a tool, either alone or in any combination thereof.

To attain this, the present invention generally comprises an elongate tubular member having inner and outer surfaces, proximal and distal ends, and a plurality of side walls extending between the proximal and distal ends. The proximal end of the tubular member is coupled to a tool head. The inner surface of the tubular member defines an interior space of the tubular member. The distal end of the tubular member has an opening into the interior space. The opening of the distal end is adapted for inserting an end of an elongate handle therethrough into the interior space of the tubular member. A fastening device is provided for holding a handle inserted into interior space of the tubular member to the tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tool handle mount apparatus and method which has many of the advantages of the devices for attaching a handle to a tool mentioned heretofore and many novel features that result in a new tool handle mount which is not anticipated, rendered obvious, suggested, or even implied by any of the prior art devices for attaching a handle to a tool, either alone or in any combination thereof.

It is another object of the present invention to provide a new tool handle mount which may be easily and efficiently manufactured and marketed.

It is a further object of the present invention to provide a new tool handle mount which is of a durable and reliable construction.

An even further object of the present invention is to provide a new tool handle mount which is susceptible of a low cost of manufacture with regard to both materials and labor, and which accordingly is then susceptible of low prices of sale to the consuming public, thereby making such tool handle mount economically available to the buying public.

Still yet another object of the present invention is to provide a new tool handle mount which provides in the apparatuses and methods of the prior art some of the advantages thereof, while simultaneously overcoming some of the disadvantages normally associated therewith.

Still another object of the present invention is to provide a new tool handle mount for attaching an elongate handle to a tool.

Yet another object of the present invention is to provide a new tool handle mount which includes an elongate tubular member having inner and outer surfaces, proximal and distal ends, and a plurality of side walls extending between the proximal and distal ends. The proximal end of the tubular member is coupled to a tool head. The inner surface of the tubular member defines an interior space of the tubular member. The distal end of the tubular member has an opening into the interior space. The opening of the distal end is adapted for inserting an end of an elongate handle therethrough into the interior space of the tubular member. A fastening device is provided for holding a handle inserted into interior space of the tubular member to the tubular member.

Still yet another object of the present invention is to provide a new tool handle mount that allows a user to interchangeably mount various lengths and shaped of handles to a tool head.

Even still another object of the present invention is to provide a new tool handle mount that allows quick and easy replacement of a broken handle from the tool head.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic top side view of the present invention.

FIG. 4 is a schematic distal end view of the present invention as seen from the vantage of line 4—4 of FIG. 3.

DESCRIPTION OF THE PREFERRED EMBODIMENT

Figure 1:
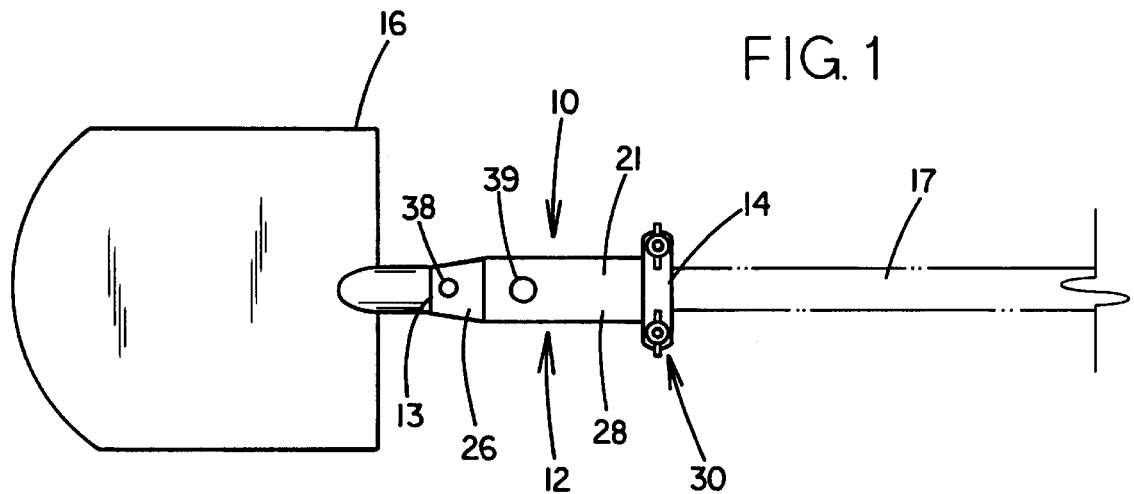
FIG. 1 is a schematic top side view of a new tool-handle mount in use holding a handle to a tool head according to the present invention.
Figure 2:
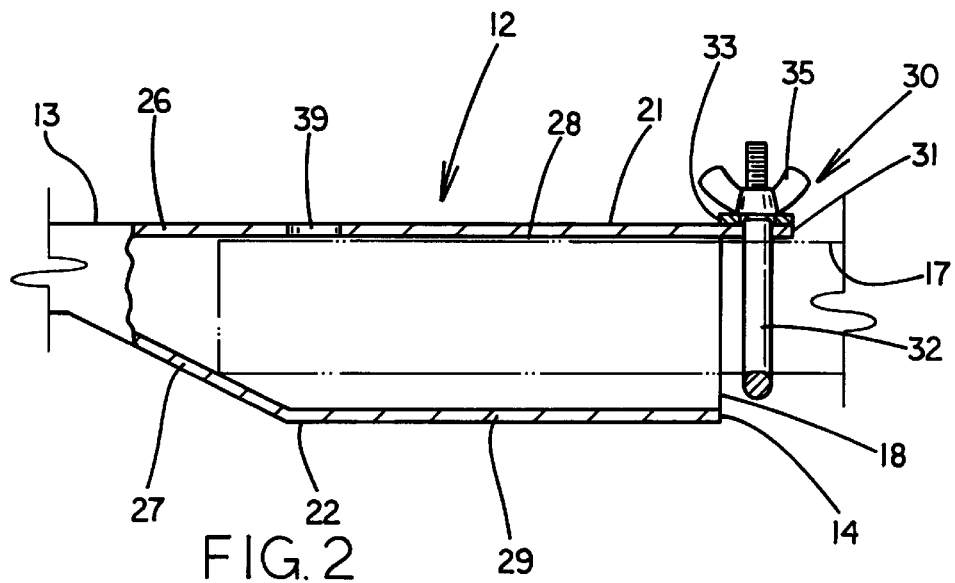
FIG. 2 is a schematic sectional side view of the present invention in use illustrating a handle inserted into the tubular member.

With reference now to the drawings, and in particular to FIGS. 1 through 4 thereof, a new tool handle mount embodying the principles and concepts of the present invention and generally designated by the reference numeral 10 will be described.

As best illustrated in FIGS. 1 through 4, the tool handle mount 10 generally comprises an elongate tubular member 12 having inner and outer surfaces, proximal and distal ends 13,14, and a plurality of side walls 21,22,23,24 extending between the proximal and distal ends 13,14. The proximal end 13 of the tubular member 12 is coupled to a tool head 16. The inner surface of the tubular member 12 defines an interior space of the tubular member 12. The distal end 14 of the tubular member 12 has an opening 18 into the interior space. The opening 18 of the distal end 14 is adapted for inserting an end of an elongate handle 17 therethrough into the interior space of the tubular member 12. A fastening device 30 is provided for holding a handle 17 inserted into interior space of the tubular member 12 to the tubular member 12.

In use, the handle mount 10 is designed for mounting an end of an elongate handle 17 to a tool head 16. Specifically, the elongate tubular member 12 has inner and outer surfaces and proximal and distal ends 13,14. The tubular member 12 also has a plurality of side walls extending between its proximal and distal ends 13,14. The proximal end 13 of the tubular member 12 is coupled to a tool head 16. The tool head 16 may be any sort of tool, such as, for example: a shovel head, a rake, a hoe, or a paint roller. The inner surface of the tubular member 12 defines the interior space of the tubular member 12. The tubular member 12 has a longitudinal axis extending between the proximal and distal ends 13,14. Ideally, the tubular member 12 has a generally rectangular cross-section taken from a plane substantially perpendicular to the longitudinal axis of the tubular member 12. The distal end 14 of the tubular member 12 has an opening 18 into the interior space. In the ideal embodiment, the opening 18 has a generally rectangular periphery. The opening 18 of the distal end 14 is adapted for inserting an end of an elongate handle 17 therethrough into the interior space of the tubular member 12. The plurality of side walls of the tubular member 12 includes first, second, third and fourth side walls 21,22,23,24. The first and second side walls 21,22 are spaced apart from each other, while the third and fourth side walls 23,24 are spaced apart from each other and positioned between the first and second side walls 21,22.

The handle mount 10 also includes a fastening device 30 for holding a handle 17 inserted into interior space of the tubular member 12 to the tubular member 12. The fastening device 30 preferably comprises a coupling flange 31, a fastening bolt 32, and an elongate washer 33. The coupling flange 31 is coupled to a side wall and is outwardly extended from the distal end 14 of the tubular member 12. Preferably, the coupling flange 31 is coupled to the first side wall 21. Ideally, the coupling flange 31 is generally coplanar with the first side wall 21. The fastening bolt 32 is generally U-shaped and has a pair of spaced apart threaded arms and an arcuate portion connecting the threaded arms of the fastening bolt 32 together. The threaded arms of the fastening bolt 32 are inserted through the coupling flange 31 such that the arcuate portion of the fastening bolt 32 extends towards the second side wall 22. The fastening bolt 32 is designed for extending around a handle 17 inserted into the interior space and outwardly extending from the distal end 14 of the tubular member 12. Each of the threaded arms of the fastening bolt 32 has a nut 34,35 threaded thereon. The nuts 34,35 are positioned adjacent the outer surface of the tubular member 12. Preferably, the elongate washer 33 is interposed between the nuts 34,35 and the outer surface of the tubular member 12. The threaded arms of the fastening bolt 32 is inserted through the washer 33.

Each of the side walls of the tubular member 12 has a proximal portion and a distal portion, with the proximal portion located adjacent the proximal end 13 of the tubular member 12 and the distal portions located adjacent the distal end 14 of the tubular member 12. The first and second side walls 21,22 each have a pair of side edges extending between the proximal and distal ends 13,14 of the tubular member 12. The portions of the side edges of the first side wall 21 located in the proximal portion 26 of the first side wall 21 converge towards each other towards the proximal end 13 of the tubular member 12. The distal portions of the first and second side walls 21,22 are preferably substantially parallel with one another. The proximal portion 27 of the second side wall 22 converges towards the proximal portion 26 of the first side wall 21 towards the proximal end 13 of the tubular member 12 such that an acute angle is formed between the proximal portions of the first and second side walls 21,22. The proximal portions of the third and fourth side walls 23,24 converge towards each other towards the proximal end 13 of the tubular member 12. Like the first and second side walls, the distal portions of the third and fourth side walls 23,24 are generally parallel with each other. Preferably, the first side wall 21 has a pair of spaced apart apertures 38,39 therethrough. One of the apertures 38 is located adjacent the proximal end 13 of the tubular member 12 while the other aperture 39 is located on the distal portion 29 of the first side wall 21 adjacent the proximal portion 26 of the first side wall 21.

In an illustrative ideal embodiment, the tubular member 12 has a length between the proximal and distal ends 13,14 between about 8 and 6 inches. In this illustrative embodiment, the tubular member 12 has a height between the distal portions of the first and second side walls 21,22 of less than about 2 inches and a width between the third and fourth side walls 23,24 of less than about 2 inches. In this illustrative embodiment, the distal portions ideally have a length between about 6 and 4 inches and the apertures 38,39 have a diameter of less than about ½ inch.

In use, a handle is inserted into the opening into the interior space of the tubular mount. The end of the handle is centered with respect to the tool head by the proximal portions of the third and fourth side walls. The angled proximal portion of the second side wall positions the handle against the first side wall to help keep the handle stable in the tubular member. The fastening device is used to secure the handle to the tubular mount.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handle mount for mounting an end of an elongate handle to a tool head, said handle mount comprising:

an elongate tubular member having inner and outer surfaces, proximal and distal ends, and a plurality of side walls extending between said proximal and distal ends;

said proximal end of said tubular member being coupled to a tool head;

said inner surface of said tubular member defining an interior space of said tubular member;

said distal end of said tubular member having an opening into said interior space, said opening of said distal end being adapted for inserting an end of an elongate handle therethrough into said interior space of said tubular member;

a fastening device for holding a handle inserted into interior space of said tubular member to said tubular members;

wherein each of said side walls of said tubular member has a proximal portion and a distal portion, said proximal portions being located adjacent said proximal end of said tubular member, said distal portions being located adjacent said distal end of said tubular member; and wherein first and second side walls of said tubular member each have a pair of side edges extending between said proximal and distal ends of said tubular member, the portions of said side edges of said first side wall located in said proximal portion of said first side wall converging towards each other towards said proximal end of said tubular member.

2. The handle mount of claim 1, wherein said tubular member has a longitudinal axis extending between said proximal and distal ends of said tubular member, and wherein said tubular member has a generally rectangular cross-section taken substantially perpendicular to said longitudinal axis of said tubular member.

3. The handle mount of claim 2, wherein said opening has a generally rectangular periphery.

4. The handle mount of claim 1, wherein said plurality of side walls of said tubular member include first, second, third and fourth side walls, said first and second side walls being spaced apart from each other, said third and fourth side walls being spaced apart from each other and positioned between said first and second side walls.

5. The handle mount of claim 1, wherein said distal portions of said first and second side walls of said tubular member are substantially parallel with one another, and wherein said distal portions of third and fourth side walls of said tubular member are generally parallel with each other.

6. The handle mount of claim 1, wherein said proximal portion of said second side wall converges towards said proximal portion of said first side wall towards said proximal end of said tubular member such that an acute angle is formed between said proximal portions of said first and second side walls.

7. The handle mount of claim 1, wherein said proximal portions of third and fourth side walls of said tubular member converge towards each other towards said proximal end of said tubular member.

8. The handle mount of claim 1, wherein a first side wall of said tubular member has a pair of spaced apart apertures therethrough, one of said apertures being located adjacent said proximal end of said tubular member, another of said apertures being located on said distal portion of said first side wall adjacent said proximal portion of said first side wall.

9. A handle mount for mounting an end of an elongate handle to a tool head, said handle mount comprising:

an elongate tubular member having inner and outer surfaces, proximal and distal ends, and a plurality of side walls extending between said proximal and distal ends;

said proximal end of said tubular member being coupled to a tool head;

said inner surface of said tubular member defining an interior space of said tubular member;

said distal end of said tubular member having an opening into said interior space, said opening of said distal end being adapted for inserting an end of an elongate handle therethrough into said interior space of said tubular member;

a fastening device for holding a handle inserted into interior space of said tubular member to said tubular member; and said fastening device comprises a coupling flange, and a fastening bolt, said coupling flange being coupled to a side wall and being outwardly extended from said distal end of said tubular member.

10. The handle mount of claim 9, wherein said coupling flange is coupled to a first side wall of said tubular member, said coupling flange being generally coplanar with said first side wall.

11. The handle mount of claim 9, wherein said fastening bolt is generally U-shaped and has a pair of spaced apart threaded arms and an arcuate portion connecting said threaded arms of said fastening bolt together, said threaded arms of said fastening bolt being inserted through said coupling flange such that said arcuate portion of said fastening bolt extends towards a second side wall of said tubular member, said fastening bolt being for extending around a handle inserted into said interior space and outwardly extending from said distal end of said tubular member.

12. The handle mount of claim 11, wherein each of said threaded arms of said fastening bolt has a nut threaded thereon, said nuts being positioned adjacent said outer surface of said tubular member.

13. The handle mount of claim 12, wherein said fastening device further includes an elongate washer, said elongate washer being interposed between said nuts and said outer surface of said tubular member, said threaded arms of said fastening bolt being inserted through said washer.

14. A handle mount for mounting an end of an elongate handle to a tool head, said handle mount comprising:

an elongate tubular member having inner and outer surfaces, proximal and distal ends, and a plurality of side walls extending between said proximal and distal ends;

said proximal end of said tubular member being coupled to a tool head;

said inner surface of said tubular member defining an interior space of said tubular member;

said tubular member having a longitudinal axis extending between said proximal and distal ends of said tubular member;

wherein said tubular member has a generally rectangular cross-section taken substantially perpendicular to said longitudinal axis of said tubular member;

said plurality of side walls of said tubular member including first, second, third and fourth side walls;

said first and second side walls being spaced apart from each other, said third and fourth side walls being spaced apart from each other and positioned between said first and second side walls;

said distal end of said tubular member having an opening into said interior space, said opening having a generally rectangular periphery, said opening of said distal end being adapted for inserting an end of an elongate handle therethrough into said interior space of said tubular member;

a fastening device for holding a handle inserted into interior space of said tubular member to said tubular member, said fastening device comprising a coupling flange, a fastening bolt, and an elongate washer;

said coupling flange being coupled to a side wall and being outwardly extended from said distal end of said tubular member, wherein said coupling flange is coupled to said first side wall, said coupling flange being generally coplanar with said first side wall;

said fastening bolt being generally U-shaped and having a pair of spaced apart threaded arms and an arcuate portion connecting said threaded arms of said fastening bolt together, said threaded arms of said fastening bolt being inserted through said coupling flange such that said arcuate portion of said fastening bolt extends towards said second side wall, said fastening bolt being for extending around an handle inserted into said interior space and outwardly extending from said distal end of said tubular member;

each of said threaded arms of said fastening bolt having a nut threaded thereon, said nuts being positioned adjacent said outer surface of said tubular member;

said elongate washer being interposed between said nuts and said outer surface of said tubular member, said threaded arms of said fastening bolt being inserted through said washer;

each of said side walls of said tubular member having a proximal portion and a distal portion, said proximal portions being located adjacent said proximal end of said tubular member, said distal portions being located adjacent said distal end of said tubular member;

said first and second side walls each having a pair of side edges extending between said proximal and distal ends of said tubular member;

the portions of said side edges of said first side wall located in said proximal portion of said first side wall converging towards each other towards said proximal end of said tubular member;

said distal portions of said first and second side walls being substantially parallel with one another;

said proximal portion of said second side wall converging towards said proximal portion of said first side wall towards said proximal end of said tubular member such that an acute angle is formed between said proximal portions of said first and second side walls;

said proximal portions of said third and fourth side walls converging towards each other towards said proximal end of said tubular member;

said distal portions of said third and fourth side walls being generally parallel with each other; and said first side wall having a pair of spaced apart apertures therethrough, one of said apertures being located adjacent said proximal end of said tubular member, another of said apertures being located on said distal portion of said first side wall adjacent said proximal portion of said first side wall.

* * * * *